May 25, 1943.　　　H. C. PIERLE　　　2,320,333
GUN BORING TOOL
Filed May 8, 1942　　　2 Sheets-Sheet 1
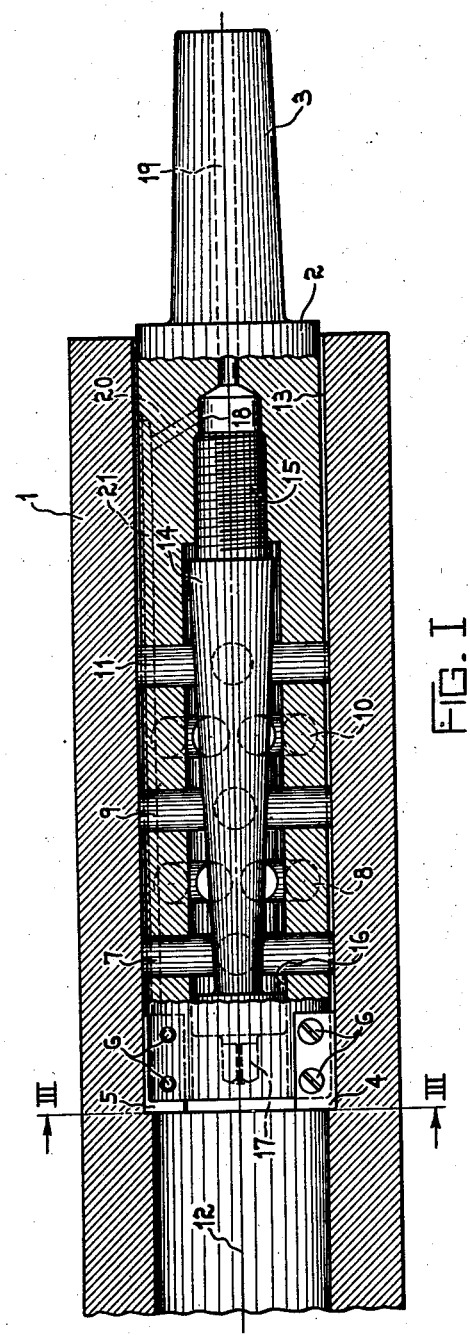
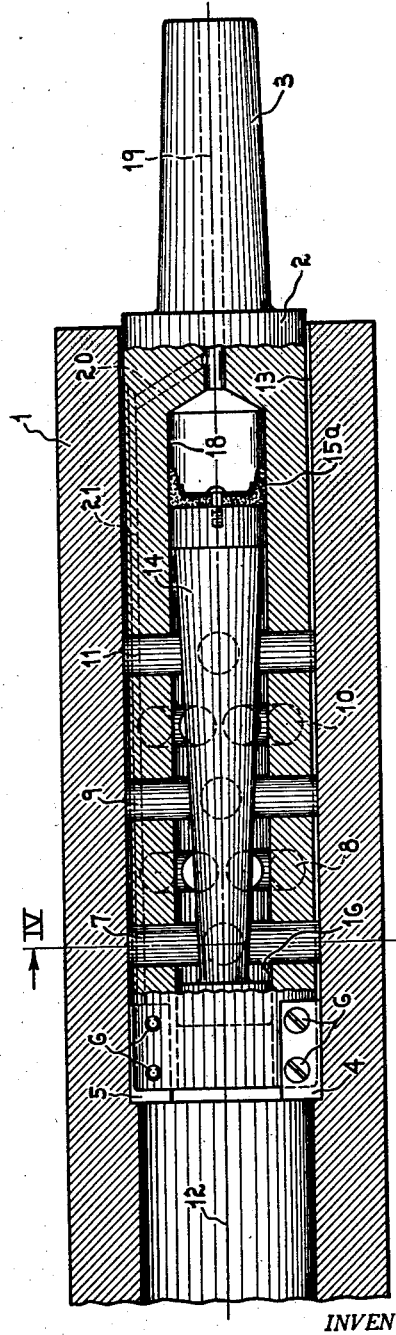
INVENTOR.
HENRY C. PIERLE
BY Willard S. Greene

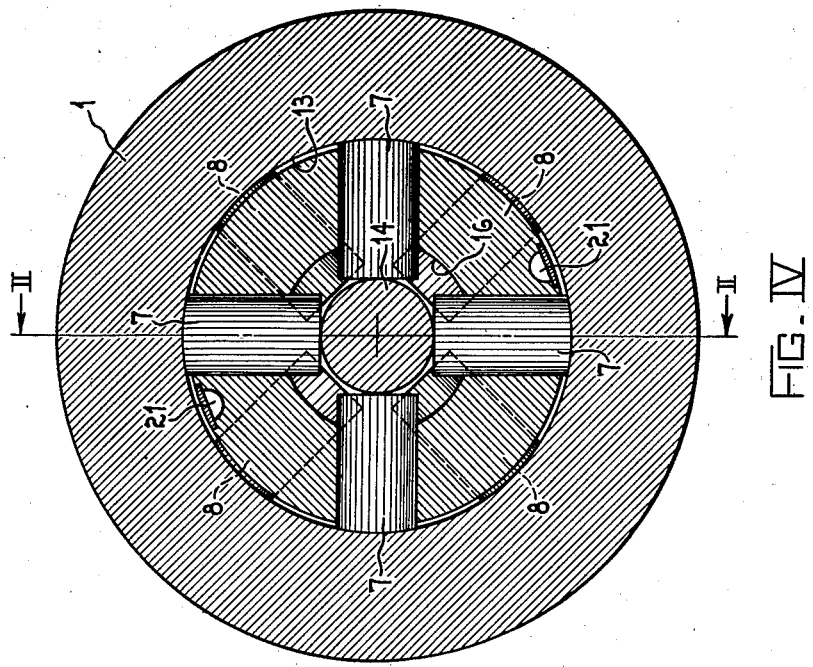
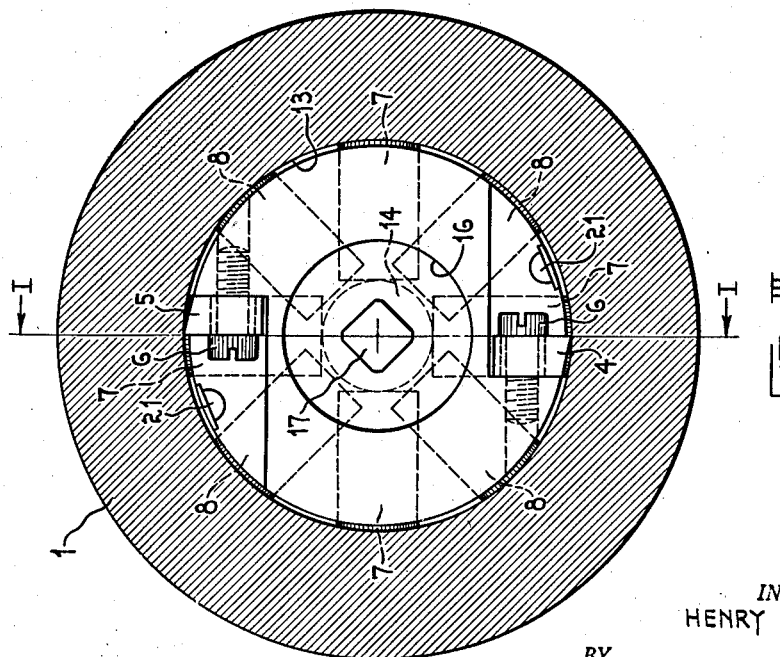

Patented May 25, 1943

2,320,333

UNITED STATES PATENT OFFICE 2,320,333

GUN BORING TOOL

Henry C. Pierle, Cincinnati, Ohio; The Central Trust Company, executor and trustee of said Henry C. Pierle, deceased, assignor to The R. K. Le Blond Machine Tool Company, Cincinnati, Ohio, a corporation of Delaware Application May 8, 1942, Serial No. 442,169

2 Claims. (Cl. 77—58)

This invention pertains to gun boring tools and is particularly related to packed-bit gun boring tools, comprising a cutting head having appropriate cutting bits operating in the bore of the gun to be machined and which bits are followed by an appropriate packing or guiding member which operates in the bore being cut by the bits. The traditional method of machining the bores of gun tools, for both roughing and finishing operations, has been by means of wood-packed boring tools or reamers. The tube is first counter-bored for a short distance in order to make certain that the cutting tool is accurately started and guided straight in proper alignment with the axis of the bore to be machined for the gun. The former type wood-packed tools consisted essentially of a cutting-head followed by two semi-cylindrical wood inserts which formed the support for the bar, riding in the bore in the gun barrel. The wood bore contacting pieces were then turned, when ready for use, in place on the boring bar to a dimension of .005 inch over the actual side of the hole being cut by these tool bits, in this way to insure a squeezing compression action on the wood inserts while at the same time preventing chatter and sidewise movement of the boring tool in the bore of the gun.

This traditional procedure, however, involves various definite disadvantages. One of the difficulties has been the rapid wear of such wooden shoes because of the excessive frictional contact with the bore of the gun, particularly during the initial portion of the boring operation. This consumes unnecessary horsepower in operating the tool in the gun and creates frictional heat, which soon results in the wearing down and deterioration of the wooden shoes to the point where they are no longer effective to prevent chatter and sidewise displacement of the cutting bits and boring bar in the gun. Because of this difficulty it was impossible to bore an accurate straight hole completely through the gun as these shoes would wear out before the bore was completed. Recently this condition has become still more aggravated with the use of tungsten carbide cutting tools which require much greater speeds of rotation for the work and tool as this would very rapidly burn off the wood surfaces and cause rapid wear in the wooden guiding shoes on the boring bar, resulting in chatter and inaccuracy of the bored hole in the gun.

It had also been attempted in the past to obviate the difficulty of the wear of these wooden pieces by the use of babbitt or other similar bearing material but this has proved unsatisfactory because of its tendency to seize and scar and become abraded by the cutting action of the chips being removed by the tool bits, therefore destroying the accuracy and the smooth finish in the bore already completed in the gun. Thus it has been found that the wood is the only satisfactory medium for contacting the finish bore of the gun because of its peculiar characteristics of holding sufficient lubricant and being sufficiently soft at the same time so as to properly slide and guide itself in the bore during the boring operation without causing any defects or scratches in the work surface.

With these facts clearly in mind it is therefore the purpose of this invention to rely on the contact of the boring tool and bar with the gun bore by means of appropriate wood inserts but at the same time to provide means whereby the wood inserts may be kept under the proper tension in the bore of the gun regardless as to whether or not wear takes place on these wood inserts. In this way elimination of all chatter is provided in the cutting tools on the boring bar while at the same time providing accurate straight boring of the gun tube while maintaining bearing contact between the boring bar and the bore of the gun without marring its finish.

Further features and advantages of this invention will appear from the detailed description of the drawings in which:

Figure I is a longitudinal section through a gun tube showing this novel boring tool operating in the bore and having its bore engaging plungers held in contact with the bore finished by the cutting bits by a mechanical adjusting means for setting proper contact of the wood inserts with the bore of the gun, as shown on the line I—I of Figure III.

Figure II is a similar longitudinal section through a gun tube showing the boring tube of this invention but illustrating a hydraulic actuating means for maintaining proper pressure of the wood contacting inserts at all times with the bore of the gun as it proceeds through the bore to thereby automatically take up wear on these inserts, as indicated on the line II—II of Figure IV.

Figure III is a transverse section through the gun tube, on the line IV—IV of Figure I, showing the front end of the boring tool, particularly indicating the position of the cutting bits, coolant distributing nozzles, and the various wood inserts for contacting the bore of the gun.

Figure IV is a similar transverse section through the gun tube and boring tool, on the line IV—IV of Figure II, particularly showing the engagement of the wood contacting inserts with the tapered adjusting member of the boring tool holder, as used in conjunction with the hydraulically actuated adjusting means for the tool holder.

Referring to Figure I, the boring tool of this invention is shown operating in a gun tube 1 and comprises a body portion 2 having the conventional tapered shank portion 3 which is connected in the usual manner to a boring bar, (not shown) of a gun boring lathe. On the inner end of the boring tool body 2 are fixed the cutter bits 4 and 5 by suitable screws 6 in diametrically opposite positions as best seen in Figure III and which bit effects the cutting of the metal in the bore to machine it to accurately sized dimension. Behind these cutter bits 4 and 5 are the bore contacting plungers 7, 8, 9, 10, and 11 arranged in groups of four in a plane perpendicular to the axis 12 of the bore being machined and axially spaced longitudinally of the body 2. Preferably the various series of contacting plugs 7, 8, 9, 10 and 11 will be staggered so as to give contact with the gun bore and support the boring tool holder 2 in every direction. Each of these contacting plugs 7 to 11 inclusive are arranged to engage the finished bore portion 13 cut in the gun tube 1 by the tool bits 4 and 5 and are maintained in proper contact with this bore 13 by means of the tapered adjusting plunger 14 which is threaded at 15 in the body portion 2 of the boring tool and is supported at its other end in a bore 16 formed in this body portion 2 and adapted to be rotated for adjusting it lengthwise of the axis 12 in the threads 15 by means of the squared end portion 17 to which may be applied an appropriate adjusting socket wrench. In this way by carefully rotating and adjusting the tapered member 14 axially each of the plungers 7 through 11 may be properly adjusted in nice, sliding, running contact with the bore 13 of the gun tube 1 so that anywhere along the gun bore these members may be properly taken up to at all times maintain positive and accurate control of the position of the tool holder 2 with respect to sidewise displacement relative to the axis 12.

An alternative construction to that shown in Figure I is that of Figure II in which the threaded portion 15 is eliminated and a suitable hydraulic piston 15a is substituted and which operates in the bore 18 formed in the body portion 2 of the tool holder. Fluid pressure is provided for the cutting bits in both cases from a suitable conduit passageway 19 and through the passageways 20 and 21 to the cutting bits 5 and 6 so as to wash the chips away from the plungers 7 (toward the left in the Figures I and II) out through the unbored portion of the bore in the gun tube 1. In the construction of Figure II this same fluid pressure is utilized to apply pressure in the cylinder 18 against the piston 15a so as to maintain the proper contact and pressure of the tapered adjusting member 14 on the plungers 7 through 11 so that they are automatically adjusted in proper contact and pressure against the bore 13 being machined in the gun barrel and any wear of the plungers in this instance is automatically taken care of so that the boring tool is held in positive accurate position at all times during its entire length of travel throughout the bore of the gun being machined.

Having thus fully set forth and described my invention what I claim as new and desire to secure by United States Letters Patent is:

1. In a boring tool holder, a body, tool bits fixed on said body, bore engaging members movable on said body for engagement with the bore being machined in said work piece, coolant passageways in said body for distributing coolant fluid to said tool bits, means in said body movable to adjust said work engaging members relative to said bore, and means whereby the fluid pressure for effecting cooling of said tool bits simultaneously effects movement of said adjusting means for said bore engaging portions of said tool holder so as to maintain continued contact of said work engaging plungers with the bore of said work piece during the cutting operation.

2. In a boring tool holder, a longitudinally extending body portion, a tapered connecting portion on said body portion for mounting said body portion on a boring bar of a machine tool, tool bits on the outer end of said body portion, coolant distributing means in said body portion conducting coolant from said boring bar to said tool bits, a tapered cylindrical adjusting means axially movable in said body portion adapted to effect radial adjustment of work engaging plungers in said body portion relative to the bore of the work being machined, and means whereby the pressure of said coolant supply for said tool bits effects axial movement in said adjusting means to maintain continued contact of said work engaging plungers with the bore of said work piece.

HENRY C. PIERLE.